(12) United States Patent
Rhoads et al.

(10) Patent No.: US 6,988,202 B1
(45) Date of Patent: Jan. 17, 2006

(54) PRE-FILTERIING TO INCREASE WATERMARK SIGNAL-TO-NOISE RATIO

(75) Inventors: Geoffrey Rhoads, West Linn, OR (US); Adnam M. Alattar, Tigard, OR (US); Ravi K. Sharma, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 09/527,971

(22) Filed: Mar. 17, 2000

Related U.S. Application Data

(63) Continuation-in-part of application No. 09/503,881, filed on Feb. 14, 2000, now Pat. No. 6,614,914, which is a continuation-in-part of application No. 09/186, 962, filed on Nov. 5, 1998, which is a continuation of application No. 08/649,419, filed on May 16, 1996, now Pat. No. 5,862,260, which is a continuation-in-part of application No. PCT/US96/06618, filed on May 7, 1996, and a continuation-in-part of application No. 08/637,531, filed on Apr. 25, 1996, now Pat. No. 5,822,436, and a continuation-in-part of application No. 08/534,005, filed on Sep. 25, 1995, now Pat. No. 5,832,119, and a continuation-in-part of application No. 08/436,102, filed on May 8, 1995, now Pat. No. 5,748,783, application No. 09/503,881, which is a continuation-in-part of application No. 09/482,749, filed on Jan. 13, 2000, now abandoned.

(60) Provisional application No. 60/125,349, filed on Mar. 19, 1999.

(51) Int. Cl.
*G06F 11/30* (2006.01)

(52) U.S. Cl. .................... 713/176; 713/181; 713/167

(58) Field of Classification Search ............... 380/252, 380/253, 54; 382/264, 263, 260, 287; 713/176, 713/167, 181
See application file for complete search history.

(56) References Cited

U.S. PATENT DOCUMENTS

| 4,237,484 A | 12/1980 | Brown et al. ............... 358/142 |
| 4,313,197 A | 1/1982 | Maxemchuk ............... 370/111 |

(Continued)

FOREIGN PATENT DOCUMENTS

| WO | WO01/39121 | 5/2001 |

(Continued)

OTHER PUBLICATIONS

U.S. Appl. No. 09/612,177, filed Jul. 6, 2000, Rhoads.

(Continued)

*Primary Examiner*—Norman M. Wright
(74) *Attorney, Agent, or Firm*—Digimarc Corporation

(57) ABSTRACT

Utilizes pre-processing (pre-filtering) of target data in order to facilitate and enable robust extraction of a watermark signal. With the present invention the watermarked data is pre-filtered using knowledge of the watermark signal. That is, utilizing knowledge of the characteristics of the watermark signal (for example that it falls in a certain frequency range), aspects or portions of the signal that do not carry the watermark signal are eliminated by filtering. Such filtering can amplify the watermark signal and/or simultaneously reduces the strength of the original (host) content or noise in the data signal that contains the watermark. That is, pre-filtering increases the signal-to-noise ratio of the watermark signal and facilitates the watermark extraction steps (detection and decoding). With the present invention it is possible to extract weak watermark signals from target data.

12 Claims, 2 Drawing Sheets

U.S. PATENT DOCUMENTS

| | | | | |
|---|---|---|---|---|
| 4,855,697 | A | * | 8/1989 | Jones et al. .................... 333/33 |
| 4,907,156 | A | * | 3/1990 | Doi et al. .................... 382/130 |
| 4,972,471 | A | * | 11/1990 | Gross et al. ................ 455/2.01 |
| 5,101,432 | A | * | 3/1992 | Webb ........................... 380/33 |
| 5,175,710 | A | * | 12/1992 | Hutson ....................... 367/135 |
| 5,319,735 | A | | 6/1994 | Preuss et al. .............. 395/2.14 |
| 5,659,726 | A | * | 8/1997 | Sandford et al. ........... 707/101 |
| 5,768,426 | A | * | 6/1998 | Rhoads ........................ 382/232 |
| 5,825,892 | A | | 10/1998 | Braudaway et al. .......... 380/51 |
| 5,832,119 | A | * | 11/1998 | Rhoads ........................ 382/232 |
| 5,841,886 | A | * | 11/1998 | Rhoads ........................ 382/115 |
| 5,841,978 | A | * | 11/1998 | Rhoads ........................ 709/217 |
| 5,850,481 | A | * | 12/1998 | Rhoads ........................ 382/232 |
| 5,859,920 | A | | 1/1999 | Daly et al. .................. 382/115 |
| 5,862,260 | A | * | 1/1999 | Rhoads ........................ 382/232 |
| 5,889,868 | A | | 3/1999 | Moskowitz .................. 380/51 |
| 5,933,798 | A | | 8/1999 | Linnartz ..................... 702/191 |
| 6,031,914 | A | | 2/2000 | Tewfik ......................... 380/54 |
| 6,122,403 | A | | 9/2000 | Rhoads ........................ 382/233 |
| 6,259,801 | B1 | * | 7/2001 | Wakasu ....................... 382/100 |
| 6,310,962 | B1 | | 10/2001 | Chung et al. ................ 382/100 |
| 6,330,673 | B1 | | 12/2001 | Levine ........................ 713/176 |
| 6,341,350 | B1 | * | 1/2002 | Miyahara et al. ........... 713/176 |
| 6,345,100 | B1 | * | 2/2002 | Levine ........................ 380/205 |
| 6,442,284 | B1 | * | 8/2002 | Gustafson et al. .......... 382/100 |
| 6,557,103 | B1 | | 4/2003 | Boncelet, Jr. et al. ...... 713/176 |
| 2002/0029338 | A1 | | 3/2002 | Bloom et al. ................ 713/176 |
| 2002/0090110 | A1 | | 7/2002 | Braudaway et al. | |

FOREIGN PATENT DOCUMENTS

| | | |
|---|---|---|
| WO | WO02/13138 | 2/2002 |

OTHER PUBLICATIONS

U.S. Appl. No. 60/351,502, filed Jan. 22, 2002, Bradley.

Kutter, Performance Improvement of Spread Spectrum Based Image Watermarking Schemes Through M-ary Modulation Dresden Information Hiding Workshop, 1999, pp. 245-259.

* cited by examiner

PRE-FILTERIING TO INCREASE WATERMARK SIGNAL-TO-NOISE RATIO

RELATED APPLICATIONS

This application claims the benefit of U.S. Provisional application 60/125,349, filed Mar. 19, 1999, and is a continuation in part of U.S. patent application Ser. No. 09/503,881, filed Feb. 14, 2000 (Now U.S. Pat. No. 6,614,914), which is a continuation in part of application Ser. No. 09/186,962, filed Nov. 5, 1998, which is a continuation of application Ser. No. 08/649,419, filed May 16, 1996 (Now U.S. Pat. No. 5,862,260). Application Ser. No. 08/649,419 is a continuation-in-part of PCT/US96/06618, fled May 7, 1996, U.S. application Ser. No. 08/637,531, filed Apr. 25, 1996 (Now U.S. Pat. No. 5,822,436), U.S. application Ser. No. 08/534,005, filed Sep. 25, 1995, (Now U.S. Pat. No. 5,832,119), and U.S. application Ser. No. 08/436,402, filed May 8, 1995, (Now U.S. Pat. No. 5,748,783). Application Ser. No. 09/503,881 is also a continuation in part of application Ser. No. 09/482,749, filed Jan. 13, 2000 (Now abandoned).

FIELD OF THE INVENTION

The present invention relates to steganography and more particularly to detecting digital watermarks.

BACKGROUND OF THE INVENTION

Techniques for embedding a hidden digital message (i.e. a digital watermark) in a host medium such as an image, audio or video are well known. Various known watermarking applications verify the presence of the watermark in a target image, audio or video medium. There are also various known techniques for detecting and extracting (i.e. reading) digital watermark signals. Many watermarking applications are based on the ability of some types of watermark signals to survive manipulations (e.g. rotation, scaling and digital/analog conversions) which tend to weaken watermark signals.

SUMMARY OF THE INVENTION

The present invention utilizes pre-processing (pre-filtering) of the target data in order to facilitate and enable robust extraction of a watermark signal. With the present invention the watermarked data is pre-filtered using knowledge of the watermark signal. That is, utilizing knowledge of the characteristics of the watermark signal (for example that it falls in a certain frequency range), aspects or portions of the signal that do not carry the watermark signal are eliminated by filtering. Such filtering can amplify the watermark signal and/or simultaneously reduces the strength of the original (host) content or noise in the data signal that contains the watermark. That is, pre-filtering increases the signal-to-noise ratio of the watermark signal and facilitates the watermark extraction steps (detection and decoding). With the present invention it is possible to extract weak watermark signals from target data.

DETAILED DESCRIPTION

Figure 1:
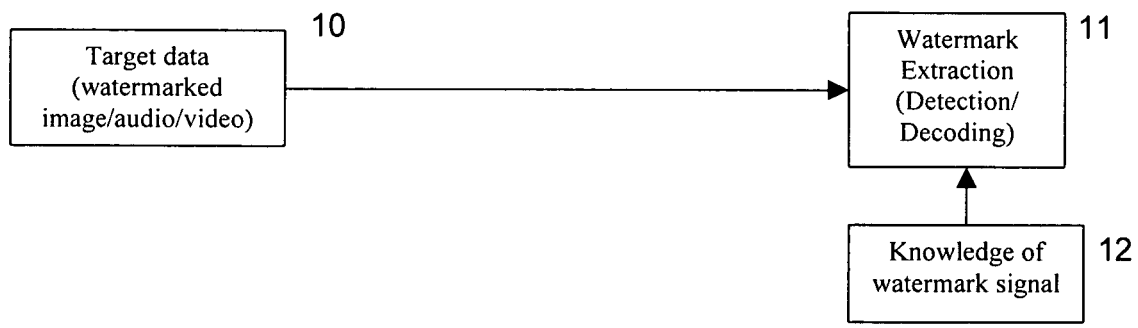
FIG. 1 is a diagram illustrating the prior art.

A prior art watermark detection system is illustrated in FIG. 1. Target data 10 which can be in the form of a watermarked image, a watermarked audio signal, or a watermarked video signal is operated on by a watermark detection and extraction device 11. Watermark detection devices generally use knowledge of the watermark signal 12 in order to detect and read or decode the watermark signal. The watermark detection device 11 can be a special purpose device, an appropriately programmed computer or a computer subroutine which is part of a larger program or device. Watermark detection and reading programs are known and commercially available.

Figure 2:
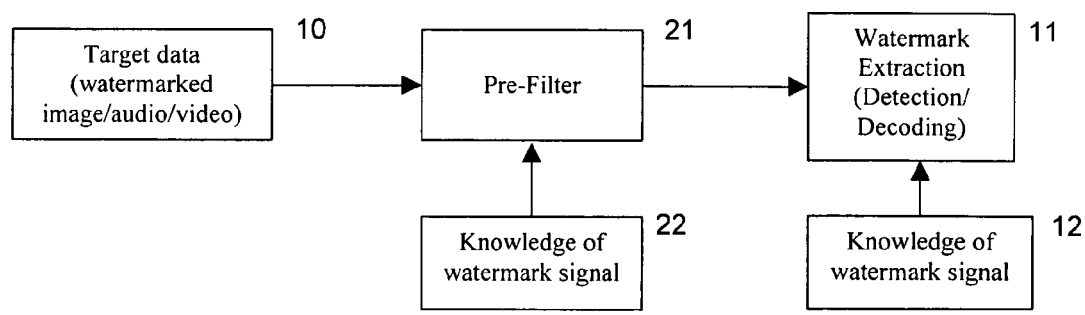
FIG. 2 is a diagram illustrating the present invention.

A preferred embodiment of the present invention is illustrated in FIG. 2. The input is similar to that shown in FIG. 1. That is the input can be a watermarked image, watermarked audio data, or watermarked video data. The data is first passed through a filter 21 which utilizes knowledge of the watermark to filter out aspects or portions of the target data that do not contain watermark information of interest.

The following description, pertains to a situation where the host medium is an image. The host image contains a conventional digital watermark that has specific frequency characteristics (while the following discussion relates to an image which is carrying watermark data, the invention is equally applicable to audio or video data that is carrying watermark data). As is conventional the watermark signal has been repeatedly embedded in several regions of the host image. Consider an image that is divided into regions of n by m pixels. The task of watermark extraction is to first identify and isolate the frequencies of interest. This is achieved by correlating the power spectrum of the target image with the power spectrum of the watermark signal. As is well known, the host image content and the manipulation applied to the watermarked image introduce noise in the correlation process.

With the present invention, the image data in each block is pre-filtered using a nonlinear filter 21 prior to watermark extraction by conventional units 11 and 12. The nonlinear pre-filter consists of two steps. The first step consists of applying a highpass filter (e.g. Laplacian operator) to each region. The highpass filter computes a new intensity value at each pixel in the image using Filtered intensity=Old intensity−average intensity of the 8 neighbors of the pixel The second step consists of applying a nonlinear operator (e.g. signum function) to the filtered output of the highpass filter. Each pixel is now modified as New intensity=1 if (Filtered intensity>0)
=0 if (Filtered intensity=0)
=−1 if (Filtered intensity<0)

The highpass filter attenuates the low frequencies and amplifies the contribution from the higher frequencies in each region. The contribution to the low frequencies is mostly from the host image content. Higher frequencies from the watermark signal are amplified. The nonlinear operation whitens the noise caused by the host image content in the frequency domain, increasing the signal-to-noise ratio of the watermark signal. Following the non-linear pre-filter, the power spectrum of several regions is added together. Since the watermark frequencies repeat through several regions, the power at those frequencies adds up. The image frequencies from region to region are generally non-repetitive and get averaged out. The resulting power spectrum contains a higher signal-to-noise ratio watermark signal, and is then correlated with the power spectrum of the watermark.

The filter is a combination of a Laplacian filter followed by a non-linear operation that limits the output of the Laplacian filter to be −1, 0, and +1. This filter is very effective in detecting the watermark signal.

In summary, the present invention can operate on any type of watermarked signal including watermarked images, watermarked audio signals and watermarked video signals. By knowing the characteristics of the watermark (for example that it falls within a certain frequency range) filtering can be used to reduce the portions of the signal that are less likely to contain the watermark signal. The LaPlacian and Signum filters used in the above embodiment of the invention are specific examples of filters that can be used; however, many other types of filters can be used in various embodiments of the invention without departing from the spirit and scope of the invention.

It will be understood by those skilled in the art that the technique of reducing or removing portions of the signal in certain frequency ranges can be applied to frequency domain watermarking methods (methods that encode auxiliary data by altering transform coefficients) in order to enhance watermark detection and reading.

By way of summary (without limiting the breath of the forgoing) this invention facilitates robust watermark extraction by applying a pre-filter that utilizes knowledge about the watermark signal. Such knowledge may include characteristics of the watermark such as specific frequencies, locations in the host medium (spatial and/or temporal) or specific properties of the host image that help locate and extract the watermark.

The entire specification of application Ser. No. 09/503,881, filed Feb. 14, 2000 (Now U.S. Pat. No. 6,614,914) and assigned to the assignee of the present invention, is hereby incorporated herein in its entirety by reference.

While the invention has been described with respect to various preferred embodiments thereof, it should be understood that various changes in form and detail may be made without departing from the spirit and scope of the invention.

We claim:

1. A system for detecting a watermark in host data which includes: a pre-filter which removes aspects of the host data that are not carrying a watermark signal, thereby enhancing the signal to noise ratio of the watermark signal, and
    a watermark detection mechanism, which utilizes knowledge of characteristics of a watermark to detect the presence of a watermark.

2. The system recited in claim 1 where the host data is image data.

3. The system recited in claim 1 where the host data is audio data.

4. The system recited in claim 1 where the host data is video data.

5. A method of extracting digital watermark data from host data which includes,
    receiving said host data as input to a watermark detection operation to detect a watermark signal embedded in said host data; and
    pre-filtering said host data prior to the watermark detection operation thereby enhancing the signal to noise ratio of the watermark signal.

6. The method recited in claim 5 wherein said pre-filtering comprises first applying a highpass operator to said host data and then applying a nonlinear operator to said data.

7. The method of claim 6 where in said highpass operator is a Laplacian operator.

8. The method of claim 6 wherein said nonlinear operator is a Signum operator.

9. The method of claim 5 wherein the host data is image data.

10. The method of claim 5 wherein the host data is audio data.

11. The method of claim 5 wherein the host data is video data.

12. The method of detecting a watermark signal in host data which includes, first filtering said host data using a high pass Laplacian filter, applying a nonlinear signum function to the output of said high pass filter, and then detecting the presence of a watermark signal in said filtered data.

* * * * *